3,226,394
PYRIDYLETHYLATED ANTHRANILAMIDES AND
DERIVATIVES THEREOF
Edgar S. Schipper, Clifton, N.J., assignor to Shulton, Inc.,
Clifton, N.J., a corporation of New Jersey
No Drawing. Filed June 16, 1964, Ser. No. 375,658
18 Claims. (Cl. 260—295)

This invention relates to anthranilamides and more particularly to pyridylethylated anthranilamides and their non-toxic salts.

The pyridylethylated anthranilamides of this invention are new compounds having the following formula:

(1)
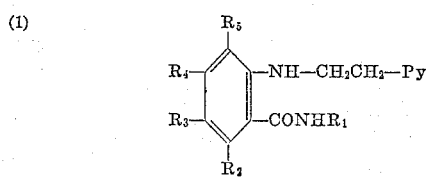

in which Py is a pyridyl radical, such as a 2-pyridyl radical or a 4-pyridyl radical; $R_1$ is hydrogen or a monovalent lower hydrocarbon radical. $R_2$ through $R_5$ is hydrogen, lower alkoxy radicals, desirably, having less than 6 carbon atoms, such as methoxy, halogens, such as bromine or chlorine, or the nitro group. Any one or more of $R_2$ through $R_5$ may have the same or different substituents. Examples of monovalent lower hydrocarbon radicals for $R_1$ are: a lower alkyl radical having less than 6 carbon atoms, for example, ethyl, isopropyl, n-butyl or isoamyl, a cycloalkyl radical, such as cyclopropyl, aralkyl radical, such as benzyl, an aryl radical such as phenyl, the allyl radical, the propargyl radical or a substituted aryl radical in which the substituent may be a lower alkyl radical, a lower alkoxy radical, such as methoxy or a halogen, such as chlorine or bromine.

The compounds of this invention manifest central nervous system depressant activity in animals at dosages from 10 to 300 mg. per kg. of body weight. Such dosages are significantly lower than the respective $LD_{50}$ of such compounds. The compounds potentiate the hypnotic action of hexobarbital, prolonging the sleeping time in mice two or three fold at dosage ranges of 1–25 mg. This action proceeds without interference of barbiturate metabolism, since readministration of the compounds to mice—pretreated with the compounds and hexobarbital and awakening from the potentiated sleep—reintroduces hypnosis. The compounds are also effective in suppressing the convulsant action of tremorine and, hence, may find usefulness as anti-parkinsonism drugs.

The new anthranilamides of this invention may be produced by reacting a quantity of a vinylpyridine with an equal molecular amount of an anthranilamide having the formula:

(2)
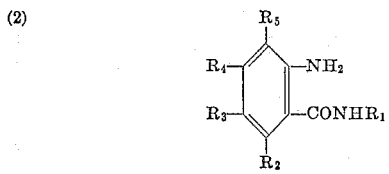

in which $R_1$, $R_2$, $R_3$, $R_4$, and $R_5$ have the same meanings as heretofore defined.

The reaction which may desirably be conducted with or without a solvent may be represented as follows:

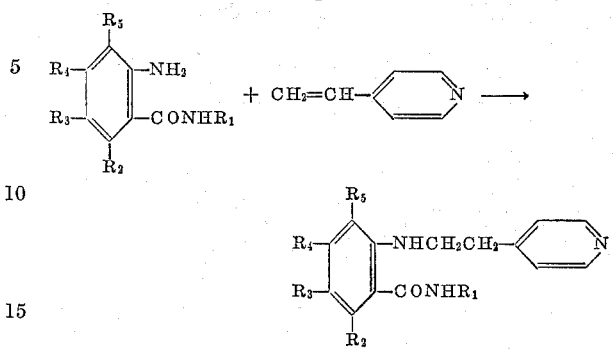

Examples of solvents in which the reaction may be conducted are methanol, ethanol, acetic acid, trifluoroacetic acid and dimethyl formamide.

The new anthranilamides which are utilized as the starting material in the production of the pyridylethylated anthranilamides as above described may be prepared by the interaction of isatoic anhydride or a substituted isatoic anhydride and the appropriate amine as follows:

(4)
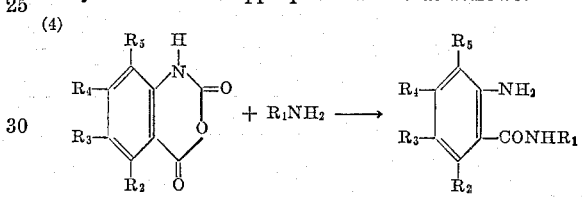

in which $R_1$ through $R_5$ have the same meaning as heretofore defined.

Another method of preparation of the anthranilamide intermediates comprises reacting the appropriate amine with an o-nitrobenzoyl chloride and subsequent reduction of the resulting o-nitrobenzamide, as follows:

(5)
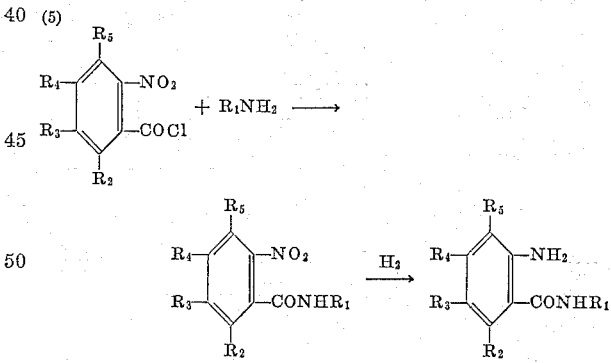

Non-toxic salts of the pyridylethylated anthranilamides of this invention are produced by mixing equimolecular amounts of the required pyridylethylated anthranilamides and the required acid in an inert solvent, such as ether, ethanol, benzene or toluene, and subsequently filtering the precipitated salt or evaporating the solvent and recovering the solid residue. Salts of inorganic acids such as hydrochloric, sulfuric or phosphoric acid or salts of organic acids, such as acetic, succinic, tartaric or ascorbic acid of the pyridylethylated anthranilamides may be produced in this manner.

A more comprehensive understanding of this invention is obtained by reference to the following examples:

EXAMPLES 1-12

2-β-(2-pyridyl)ethylaminobenzamide
2-β-(4-pyridyl)ethylaminobenzamide
2-β-(4-pyridyl)ethylamino-5-chlorobenzamide
2-β-(4-pyridyl)ethylamino-4-chlorobenzamide
2-β-(4-pyridyl)ethylamino-5-nitrobenzamide
2-β-(4-pyridyl)ethylamino-N-n-propylbenzamide
2-β-(4-pyridyl)ethylamino-5-chloro-N-cyclopropylbenzamide
2-β-(4-pyridyl)ethylamino-5-chloro-N-homoveratrylbenzamide
2-β-(4-pyridyl)ethylamino-5-chloro-N-p-anisylbenzamide
2-β-(4-pyridyl)ethylamino-5-chloro-N-propargylbenzamide
2-β-(4-pyridyl)ethylamino-N-o-tolylbenzamide
2-β-(4-pyridyl)ethylamino-N-p-chlorophenylbenzamide Each of the above pyridylethylanthranilamides was prepared by reacting 0.1 M of the anthranilamide required and denoted in the following Table I, with 0.1 M of a vinylpyridine (10.5 g.) also specified in the following Table I for the particular pyridylethylated anthranilamide desired in the persence of 0.1 M of glacial acetic acid (5.9 ml.) and 50 ml. of methanol. The mixture was refluxed from 4-24 hours. The solvent was evaporated under reduced pressure and the residue was poured onto ice and made basic with a concentrated solution of potassium hydroxide. The precipitate was collected, washed with water, dried and recrystallized from an organic solvent.

Table I

| Example | Pyridylethylated anthranilamide produced | Reactants used in production | |
|---|---|---|---|
| | | Anthranilamide intermediate | Vinyl pyridine |
| 1 | 2-β-(2-pyridyl) ethylaminobenzamide. | Anthranilamide. | o-Vinylpyridine. |
| 2 | 2-β-(4-pyridyl) ethylaminobenzamide. | ----do---- | p-Vinylpyridine. |
| 3 | 2-β-(4-pyridyl) ethylamino-5-chlorobenzamide. | 2-amino-5-chlorobenzamide. | Do. |
| 4 | 2-β-(4-pyridyl) ethylamino-4-chlorobenzamide. | 2-amino-4-chlorobenzamide. | Do. |
| 5 | 2-β-(4-pyridyl) ehtylamino-5-nitrobenzamide. | 2-amino-5-nitrobenzamide. | Do. |
| 6 | 2-β-(4-pyridyl) ethylamino-N-n-propylbenzamide. | 2-amino-N-n-propylbenzamide. | Do. |
| 7 | 2-β-(4-pyridyl) ethylamino-5-chloro-N-cyclopropylbenzamide. | 2-amino-5-chloro-N-cyclopropylbenzamide. | Do. |
| 8 | 2-β-(4-pyridyl) ethylamino-5-chloro-N-homoveratrylbenzamide. | 2-amino-5-chloro-N-homoveratrylbenzamide. | Do. |
| 9 | 2-β-(4-pyridyl) ethylamino-5-chloro-N-p-anisylbenzamide. | 2-amino-5-chloro-N-p-anisylbenzamide. | p-Vinylpyridine. |
| 10 | 2-β-(4-pyridyl) ethylamino-5-chloro-N-propargylbenzamide. | 2-amino-5-chloro-N-propargylbenzamide. | Do. |
| 11 | 2-β-(4-pyridyl) ethylamino-N-o-tolylbenzamide. | 2-amino-N-o-tolylbenzamide. | Do. |
| 12 | 2-β-(4-pyridyl) ethylamino-N-p-chlorophenyl benzamide. | 2-amino-N-p-chlorophylbenzamide. | Do. |

The following table shows the solvent which was used in the recrystallization of the anthranilamides of each of the examples and the melting point, analysis of carbon, hydrogen and nitrogen, as calculated and found, and yield of each of the anthranilamides produced by the practice of each of the examples.

Table II

| Example | Solvent used in recrystallization | M.P., °C. | Analysis | | | | | | Yield, percent |
|---|---|---|---|---|---|---|---|---|---|
| | | | Calculated | | | Found | | | |
| | | | C | H | N | C | H | N | |
| 1 | Ethyl acetate | 137-138 | 69.69 | 6.27 | 17.42 | 69.93 | 6.51 | 17.50 | 58 |
| 2 | Ethanol | 167-168 | 69.69 | 6.27 | 17.42 | 69.74 | 6.50 | 17.65 | 55 |
| 3 | Methanol | 218-219 | 60.98 | 5.12 | 15.24 | 61.04 | 5.36 | 15.21 | 81 |
| 4 | Ethyl acetate/ethanol | 175-177 | 60.98 | 5.12 | 15.24 | 60.82 | 5.36 | 15.47 | 62 |
| 5 | Methanol/ethanol 1:1 | 268-270 | 58.73 | 4.93 | 19.57 | 58.94 | 5.02 | 19.75 | 6 |
| 6 | Ether | 55-57 | 72.05 | 7.47 | | 72.58 | 7.37 | | 44 |
| 7 | 60% methanol | 177-178 | 64.65 | 5.74 | 13.31 | 64.23 | 5.76 | 13.21 | 56 |
| 8 | Ether/ethyl acetate | 113-114 | 65.52 | 5.97 | 9.57 | 65.28 | 6.14 | 9.71 | 15 |
| 9 | Ether | 144-145 | 66.04 | 5.27 | 11.00 | 65.23 | 5.15 | 10.72 | 41 |
| 10 | Ethyl acetate | 191-192 | 65.08 | 5.14 | 13.39 | 65.02 | 5.04 | 13.53 | 71 |
| 11 | ----do---- | 124-125 | 76.10 | 6.39 | 12.68 | 75.98 | 6.37 | 12.76 | 86 |
| 12 | Benzene/hexane | 178-179 | 68.27 | 5.15 | 11.94 | 68.25 | 5.09 | 11.97 | 35 |

The 2-amino-5-chloro-N-cyclopropylbenzamide used as an intermediate in Example 7, the 2-amino-5-chloro-N-homoveratrylbenzamide used as an intermediate in Example 8 and the 2-amino-5-chloro-N-propargylbenzamide of Example 10 were prepared by the method of Clark and Wagner, J. Org. Chem., 9, 55 (1944) by the interaction of 5-chloroisatoic anhydride with cyclopropylamine in the production of 2-amino-5-chloro-N-cyclopropylbenzamide, with homoveratrylamine in the production of 2-amino-5-chloro-N-homoveratrylbenzamide, and with propargylamine in the production of 2-amino-5-chloro-N-propargylbenzamide.

The 2-amino-5-chloro-N-cyclopropylbenzamide was obtained in 89% yield and had a melting point of 151-153° C. Analysis showed 56.72% of carbon, 5.34% hydrogen and 13.44% nitrogen compared with theoretical values of 57.01% carbon, 5.26% hydrogen and 13.30% nitrogen.

The 2-amino-5-chloro-N-homoveratrylbenzamide was obtained in 71% yield and had a melting point of 130-132° C. Analysis showed 61.29% carbon, 5.70% hydrogen and 8.38% nitrogen compared with theoretical values of 60.98% carbon, 5.72% hydrogen and 8.37% nitrogen.

The 2-amino-5-chloro-N-propargylbenzamide was obtained in a yield of 67% and had a melting point of 117° C. Analysis showed 57.55% carbon, 4.50% hydrogen and 13.60% nitrogen compared with theoretical values of 57.56% carbon, 4.35% hydrogen and 13.43% nitrogen.

The 2-amino-N-o-tolyl-benzamide employed as an intermediate in Example 11 is produced by initially preparing 2-nitro-N-o-tolylbenzamide and reducing the nitro compound to the corresponding 2-amino compound. The 2-nitro-N-o-tolylbenzamide was prepared as follows: A solution of 77.5 g. of o-nitrobenzoyl chloride in 100 ml. of dry benzene was added dropwise to a stirred solution of 91 g. of o-toluidine in 200 ml. of dry benzene. The resulting mixture was refluxed for 1 hour and filtered. The insoluble portion was extracted with three two liter portions of boiling toluene. The extracts were combined and cooled. The product was filtered off and recrystallized from toluene.

The 2-nitro-N-o-tolylbenzamide was obtained in 82% yield and had a melting point of 178–179° C. Analysis showed 65.70% carbon, 4.65% hydrogen and 10.65% nitrogen compared with theoretical values of 65.61% carbon, 4.72% hydrogen and 10.93% nitrogen.

To produce the 2-amino-N-o-tolylbenzamide, a solution of 66 g. of 2-nitro-N-o-tolylbenzamide in 600 ml. of ethanol was subjected in the presence of 5% palladium on charcoal catalyst to hydrogenation at an initial pressure of 3 atmospheres. After completed reduction, the catalyst and solvent were removed and the residue recrystallized from hexane. A yield of 93% of 2-amino-N-o-tolylbenzamide having a melting point of 107–108° C. was obtained. Analysis showed 73.97% carbon, 6.01% hydrogen and 12.15% nitrogen compared with theoretical values of 74.31% carbon, 6.24% hydrogen and 12.38% nitrogen.

The 2-amino-N-p-chlorophenylbenzamide used in Example 12 was produced as follows: A solution of 71 g. of 2-nitro-N-p-chlorophenylbenzamide in 600 ml. of ethanol was subjected in the presence of 5% palladium on charcoal catalyst to hydrogenation at an initial pressure of 3 atmospheres. After completed reduction, the catalyst and solvent were removed and the residue was recrystallized from ethanol. The 2-amino-N-p-chlorophenylbenzamide was obtained in 85% yield and had a melting point of 148–150° C. Analysis showed 63.45% carbon, 4.56% hydrogen and 11.62% nitrogen compared with theoretical values of 63.29% carbon, 4.50% hydrogen and 11.36% nitrogen.

EXAMPLES 13–14

2-β-(4-pyridyl)ethylamino-N-allylbenzamide
2-β-(4-pyridyl)ethylamino-N-propargylbenzamide The above pyridylethylated anthranilamides were prepared by refluxing for a period of 4 to 24 hours 0.1 M of 4-vinylpyridine (10.5 g.), 0.1 M of glacial acetic acid (5.9 ml.), 50 ml. of methanol and 0.1 M of 2-amino-N-allylbenzamide in the production of 2-β-(4-pyridyl)ethylamino-N-allylbenzamide or 0.1 m of 2-amino-N-propargylbenzamide for the production of 2-β-(4-pyridyl)ethylamino-N-propargylbenzamide. After refluxing, the solvent was evaporated under reduced pressure and the residue was poured onto ice and made basic with a concentrated solution of potassium hydroxide. The desired pyridylethylated anthranilamide was extracted from the reaction mixture with ether. The extract was dried and the solvent evaporated. The residue was recrystallized with isopropanol in the case of 2-β-(4-pyridyl)ethylamino-N-allylbenzamide and with ether in the case of 2-β-(4-pyridyl)ethylamino-N-propargylbenzamide.

The 2-β-(4-pyridyl)ethylamino-N-allybenzamide was obtained in a yield of 47% of the theoretical and had a melting point of 76–77° C. Analysis showed that it contained 72.75% carbon and 7.18% hydrogen, as contrasted with theoretical values of 72.57% carbon and 6.81% hydrogen.

The 2-β-(4-pyridyl)ethylamino-N-propargylbenzamide was obtained in a yield of 59% of the theoretical and had a melting point of 116–117° C. Analysis showed it to contain 73.38% carbon and 6.38% hydrogen compared with theoretical values of 73.09% carbon and 6.14% hydrogen.

The 2-amino-N-allylbenzamide used as intermediate in Example 13 was prepared by the interaction of isatoic anhydride and allylamine. The 2-amino-N-allybenzamide was recrystallized from methylcyclohexane. It was obtained in a yield of 90% and had a melting point of 92–93° C. Analysis showed 68.37% carbon, 6.95% hydrogen and 15.74% nitrogen, compared with 68.15% carbon, 6.86% hydrogen and 15.90% nitrogen, on a theoretical basis.

The 2-amino-N-propargylbenzamide used as intermediate in Example 14 was prepared by the interaction of isatoic anhydride and propargylamine. The 2-amino-N-propargylbenzamide was crystallized from ethyl acetate.

The 2-amino-N-propargylbenzamide was obtained in a yield of 25% and had a melting point of 98–99° C. Analysis showed 69.20% carbon, 6.07% hydrogen and 16.09% nitrogen, compared with theoretical values of 68.94% carbon, 5.79% hydrogen and 16.08% nitrogen.

EXAMPLE 15

2-β-(4-pyridyl)ethylamino-6-methoxybenzamide

There was refluxed for a period from 4 to 24 hours a mixture of 0.1 M of 4-vinylpyridine (10.5 g.), 0.1 M of glacial cetic acid (5.9 ml.), 50 ml. of dimethylformamide and 0.1 M of 2-amino-6-methoxybenzamide. The solvent was evaporated under reduced pressure and the residue was poured onto ice and made basic with a concentrated solution of potassium hydroxide. The precipitate was collected, washed with water, dried, and recrystallized from ethyl acetate.

The yield of the 2-β-(4-pyridyl)ethylamino-6-methoxybenzamide obtained was 58% of the theoretical and had a melting point of 188–189° C. Analysis showed it to contain 66.66% carbon, 6.41% hydrogen and 15.79% nitrogen compared with theoretical values of 66.41% carbon, 6.32% hydrogen and 15.49% nitrogen.

EXAMPLE 16

2-β-(4-pyridyl)ethylamino-4,5-dimethoxybenzamide

This pyridylethylated anthranilamide was prepared by initially producing 4,5-dimethoxyanthranilamide. The 4,5-dimethoxyanthranilamide was produced by heating a mixture of 18.5 g. of 2-nitro-4,5-dimethoxybenzoic acid and 30 ml. of thionyl chloride on a water bath at 80° C. for two hours. The solution was diluted with 120 ml. of dry benzene and 80 ml. of dry ether. This solution was added dropwise to a stirred and cool solution of ammonium hydroxide (200 ml.). The mixture was stirred overnight at room temperature. The solid was filtered off and washed with water and ether. It was recrystallized from ethyl acetate. The product, 2-nitro-4,5-dimethoxybenzamide, was obtained in a yield of 15.5 g. and melted at 196–197° C. Analysis showed carbon 48.58%, hydrogen 4.64% and nitrogen 12.20% compared with theoretical values of carbon 48.80%, hydrogen 4.45% and nitrogen 12.39%.

A slurry of 7.5 g. of 2-nitro-4,5-dimethoxybenzamide in 200 ml. of ethanol was hydrogenated at an initial pressure of 42 lbs., using a 10% palladium on charcoal catalyst. After completed reduction, the catalyst and solvent were removed and the residue was recrystallized from ethyl acetate. The product, 4,5-dimethoxyanthranilamide, was obtained in a yield of 4.5 g. and melted at 143–144° C. Analysis showed carbon 55.38%, hydrogen 6.35% and nitrogen 13.54% compared with theoretical values of carbon 55.10% hydrogen 6.16% and nitrogen 14.28%.

The 4,5-dimethoxyanthranilamide so produced was employed to prepare the 2-β-(4-pyridyl)ethylamino-4,5-dimethoxybenzamide. 0.1 M of the 4,5-methoxyanthranilamide and 0.1 M of 4-vinylpyridine were fused for 2 to 8 hours at 140–160° C.

The resulting 2-β-(4-pyridyl)ethylamino-4,5-dimethoxybenzamide was recrystallized in ethyl acetate. It was obtained in a yield of 52% and had a melting point of 207–208° C. Analysis showed carbon 63.51%, hydrogen 6.38% and nitrogen 13.97% compared with theoretical values of carbon 63.79%, hydrogen 6.36% and nitrogen 13.95%.

Pharmacological tests were conducted to ascertain the effect of the addition of compounds of this invention in the prolongation action of hexobarbital. For this purpose, 2-β-(4-pyridyl)ethylaminobenzamide of Example 2 and 2-β-(4-pyridyl)ethylamino-5-chlorobenzamide of Example 3 were selected for this study. The procedure of the testing was as follows:

Adult, male Swiss albino mice (19 to 30 g.) were divided into groups of ten and fasted overnight. The test compounds were administered intraperitoneally at the dosage levels indicated in Table III ten minutes prior to the intraperitoneal injection of 100 mg./kg. of hexobarbital sodium. Control mice received the same dose of hexobarbital sodium without pretreatment. The interval between the loss and spontaneous return of the righting reflex (sleeping time) was recorded for each animal and mean sleeping times for treated and control groups were compared statistically.

Solutions of the test material were prepared daily by dissolving the weighed amount of the sample in a minimal amount of 1.0 N HCl and diluting the final volume with saline. The concentration of the test solutions was 10 mg./ml.

The results of this study are summarized in Table III. These results show that both test compounds markedly prolonged hexobarbital sleeping time at the 100 mg./kg. dosage level. At this dosage level 2-β-(4-pyridyl)ethylamino-5-chlorobenzamide shows a most potent prolongation resulting in a mean sleeping time of greater than 720 minutes as compared to 30.0±9.5 minutes for controls. Four of the animals receiving this pretreatment dose of 2-β-(4-pyridyl)ethylamino-5-chlorobenzamide slept for more than 12 hours and a fifth slept for over 19 hours. Also, the combination of 100 mg./kg. of 2-β-(4-pyridyl)ethylamino-5-chlorobenzamide and 100 mg./kg. of hexobarbital was lethal to two of the 10 animals tested.

At the lower intraperitoneal dosage levels tested [10 mg./kg. for 2-β-(4-pyridyl)ethylaminobenzamide and 1.0 mg./kg. for 2-β-(4-pyridyl)ethylamino-5-chlorobenzamide], both compounds significantly prolonged hexobarbital sleeping time. At the lower dosage level of 1.0 mg./kg., the 2-β-(4-pyridyl)ethylamino-5-chlorobenzamide more than doubled sleeping time when compared to controls (79.8 minutes vs. 28.9 minutes). In earlier work, an intravenous dose of 1.7 mg./kg. of chlorpromazine was found to potentiate hexobarbital to about the same degree (58.6 minutes vs. 21.7 minutes) as the intraperitoneal injection of 1.0 mg./kg. of 2-β-(4-pyridyl)ethylamino-5-chlorobenzamide.

The results of this study indicates that the two compounds of this invention tested significantly prolong hexobarbital sleeping time.

Table III

THE EFFECTS OF PRETREATMENT WITH 2-β-(4-PYRIDYL)ETHYLAMINOBENZAMIDE AND 2-β-(4-PYRIDYL)ETHYLAMINO-5-CHLOROBENZAMIDE ON HEXOBARBITAL SLEEPING TIME IN MICE [1]

| Pretreatment compounds | Dosage level, mg./kg. | Mean sleeping time±S.D., minutes | |
|---|---|---|---|
| | | Pretreated | Controls |
| 2-β-(4-pyridyl)ethylaminobenzamide | 100 | 359.2±46.7 | 30±9.5 |
| | 10 | 84.5±13.7 | 28.9±11.6 |
| 2-β-(4-pyridyl)ethylamino-5-chlorobenzamide | 100 | [2] 720 | 30±9.5 |
| | 1.0 | 79.8±52.8 | 28.9±11.6 |

[1] Hexobarbital sodium, 100 mg./kg. intraperitoneally administered 10 minutes after pretreatment; 10 mice injected at each dose level.
[2] All animals not observed for duration of experiment due to excessive sleeping times.

In another pharmacological testing, the hexobarbital potentiation of 2-β-(4-pyridyl)ethylamino-6-methoxybenzamide of Example 15 was determined. In this testing, male Swiss albino mice weighing between 16 and 25 grams were fasted overnight with water available ad libitum. Three groups of ten mice each received dosage levels of 15, 30 and 60% of the $LD_{50}$ of the test compound. The 2-β-(4-pyridyl)ethylamino-6-methoxybenzamide was administered intravenously 10 minutes prior to the intraperitoneal administration of 100 mg./kg. hexobarbital sodium. Control mice received the same dose of hexobarbital sodium but were pretreated with the solvent used to prepare the test material (saline adjusted to pH 3.0 with 1 N HCl). The interval between the loss and spontaneous regaining of the righting reflex (sleeping time) was recorded for each animal and mean sleeping times for treatment and control groups were compared statistically. To determine if the test compounds potentiated the hypnotic effects of hexobarbital or if it produced sleeping time, the animals were challenged with the test material upon regaining the righting reflex. A true potentiating agent reinduces sleep when subhypnotic amounts of hexobarbital are present; whereas, a prolonging agent does not reinduce sleep. For example, it has been shown that chlorpromazine potentiates hexobarbital sleeping time. Chlorpromazine causes subhypnotic doses of hexobarbital to become hypnotic though it does not affect the metabolism of the barbiturate and is, therefore, a true potentiator.

Solutions of the 2-β-(4-pyridyl)ethylamino-6-methoxybenzamide used in these testings were prepared by dissolving the weighed amount of test material in a minimal amount of 1 N HCl and diluting to volume with saline. The pH of the solutions of the test material was found to be 3.0.

The results of this study are summarized in the following Table IV:

Table IV

EFFECT OF PRETREATMENT WITH 2-β-(4-PYRIDYL)ETHYLAMINO-6-METHOXYBENZAMIDE ON HEXOBARBITAL SLEEPING TIME IN MICE

| Percent of $LD_{50}$ | Dosage level, mg./kg. | Mean sleeping time in minutes±S.E. | |
|---|---|---|---|
| | | Control | Pretreated |
| 15 | 25.2 | 28±2 | 84±9 |
| 30 | 50.4 | 28±2 | 147±8 |
| 60 | 100.8 | 28±2 | 208±13 |

These results show that 2β-(4-pyridyl)ethylamino-6-methoxybenzamide significantly prolonged hexobarbital sleeping times at all dosage levels tested.

Challenge doses of 2-β-(4-pyridyl)ethylamino-6-methoxybenzamide were administered to the treated mice. The results of this treatment is indicated in the following Table V.

Table V

THE EFFECT OF A CHALLENGE DOSE OF 2-β-(4-PYRIDYL)ETHYLAMINO-6-METHOXYBENZAMIDE ON ANIMALS WHICH HAVE REGAINED THE RIGHTING REFLEX

| Pretreatment compound | Percent $LD_{50}$ | Dosage level, mg./kg. | Mean extended sleep time±S. E., min. |
|---|---|---|---|
| Control hexobarbital [1] | | 100 | 54±3 |
| 2-β-(4-pyridyl) ethylamino-6-methoxybenzamide | 15 | 25.2 | [2] |
| | 30 | 50.4 | 41±5 |
| | 60 | 100.8 | 56±5 |

[1] Hexobarbital sodium readministered to the solvent controls for the purpose of comparison.
[2] Challenge dose did not reduce sleep.

Following a challenge dose of 2-β-(4-pyridyl)ethylamino-6-methoxybenzamide, sleep was reinduced at both the intermediate and high dose levels for a period comparable to the apparent potentiation induced by the challenge dose of hexobarbital. This test indicates that in animals 2-β-(4-pyridyl)ethylamino-6-methoxybenzamide can be classified as a true potentiator rather than a prolongation agent.

Compounds of this invention manifested anti-tremorine activity when tested pharmacologically on mice. For this purpose 2-β-(4-pyridyl)ethylamino-5-chlorobenzamide of Example 3 and 2-β-(4-pyridyl)ethylamino-6-methoxybenzamide of Example 15 were selected as the test compounds. The testing was conducted as follows:

Adult male mice, weighing 17 to 24 grams, were fasted 18 hours prior to the test period. The animals were divided into three groups of five animals per group for each compound. One group of 5 mice served as controls; these animals received saline followed by tremorine 15 minutes later. Tremorine (15 mg./kg.) was administered interperitoneally to each group 15, 30 and 60 minutes following the administration of the test compound. Observation for tremors and cholinergic reactions were noted as to onset, grade and duration of pharmacotoxic activity.

The 2-β-(4-pyridyl)ethylamino-5-chlorobenzamide and the 2-β-(4-pyridyl)ethylamino-6-methoxybenzamide were prepared with a minimal amount of 1 N HCl and diluted to a final volume with saline. The final pH was 3.0. Tremorine was prepared in saline with a pH of 7.0. Control animals received equivalent amounts of solvents.

2-β-(4-pyridyl)ethylamino-5-chlorobenzamide at an intravenous dosage level of 31.6 mg./kg. followed after 15 minutes by tremorine abolished the effects of the agonist. Delayed onset, decreased duration, and reduced intensity of tremors were also seen following administration of ethopropazine, a known anti-convulsant agent. The 2-β-(4-pyridyl)ethylamino-5-chlorobenzamide at 15.8 mg./kg. was ineffective in antagonizing the tremorine effects. When tremorine was administered 30 and/or 60 minutes after the administration of 2-β-(4-pyridyl)ethylamino-5-chlorobenzamide (31.6 mg./kg.), no anti-tremorine activity was observed. The $ED_{50}$ was approximately 70% of the $LD_{50}$. Intravenous administration of 2-β-(4-pyridyl)ethylamino-6-methoxybenzamide at 100 mg./kg. followed by tremorine 30 and/or 60 minutes later delayed onset of tremors. The anti-tremorine activity of 2-β-(4-pyridyl)ethylamino-6-methoxybenzamide is therefore qualitatively similar to that of ethopropazine relative to the onset of tremors.

What is claimed is:

1. A compound selected from the class consisting of pyridylethylated anthranilamides and acid addition salts thereof; said anthranilamides having the formula:

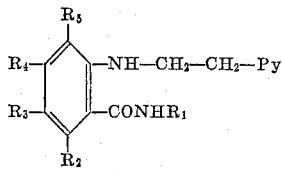

in which Py is a pyridyl radical; $R_1$ is selected from the group consisting of hydrogen and monovalent lower hydrocarbon radicals; and $R_2$, $R_3$, $R_4$ and $R_5$ are members selected from the class consisting of hydrogen, lower alkoxy, and the nitro group and halogens.

2. 2-β-(2-pyridyl)ethylaminobenzamide.
3. 2-β-(4-pyridyl)ethylaminobenzamide.
4. 2-β-(4-pyridyl)ethylamino-5-chlorobenzamide.
5. 2-β-(4-pyridyl)ethylamino-4-chlorobenzamide.
6. 2-β-(4-pyridyl)ethylamino-5-nitrobenzamide.
7. 2-β-(4-pyridyl)ethylamino-6-methoxybenzamide.
8. 2-β-(4-pyridyl)ethylamino-N-n-propylbenzamide.
9. 2-β-(4-pyridyl)ethylamino-N-allylbenzamide.
10. 2-β-(4-pyridyl)ethylamino-5-chloro-N-cyclopropylbenzamide.
11. 2-β-(4-pyridyl)ethylamino - 5 - chloro - N - homoveratrylbenzamide.
12. 2-β-(4-pyridyl)ethylamino-N-propargylbenzamide.
13. 2-β-(4-pyridyl)ethylamino-5-chloro-N-p-anisylbenzamide.
14. 2-β-(4-pyridyl)ethylamino-4,5 - dimethoxybenzamide.
15. 2-β-(4-pyridyl)ethylamino-5-chloro - N - propargylbenzamide.
16. 2-β-(4-pyridyl)ethlamino-N-o-tolylbenzamide.
17. 2-β-(4-pyridyl)ethylamino-N-p - chlorophenylbenzamide.
18. The process of producing a compound selected from the class consisting of pyridylethylated anthranilamides and acid addition salts thereof; said anthranilamides having the formula:

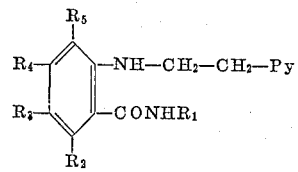

in which Py is a pyridyl radical; $R_1$ is selected from the group consisting of hydrogen and monovalent lower hydrocarbon radicals; and $R_2$, $R_3$, $R_4$ and $R_5$ are members selected from the class consisting of hydrogen, lower alkoxy radicals, the nitro group and halogens; said process comprising reacting a vinylpyridine with an anthranilamide having the formula:

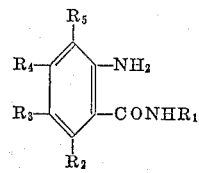

No references cited.

WALTER A. MODANCE, *Primary Examiner.*